Figure 6:
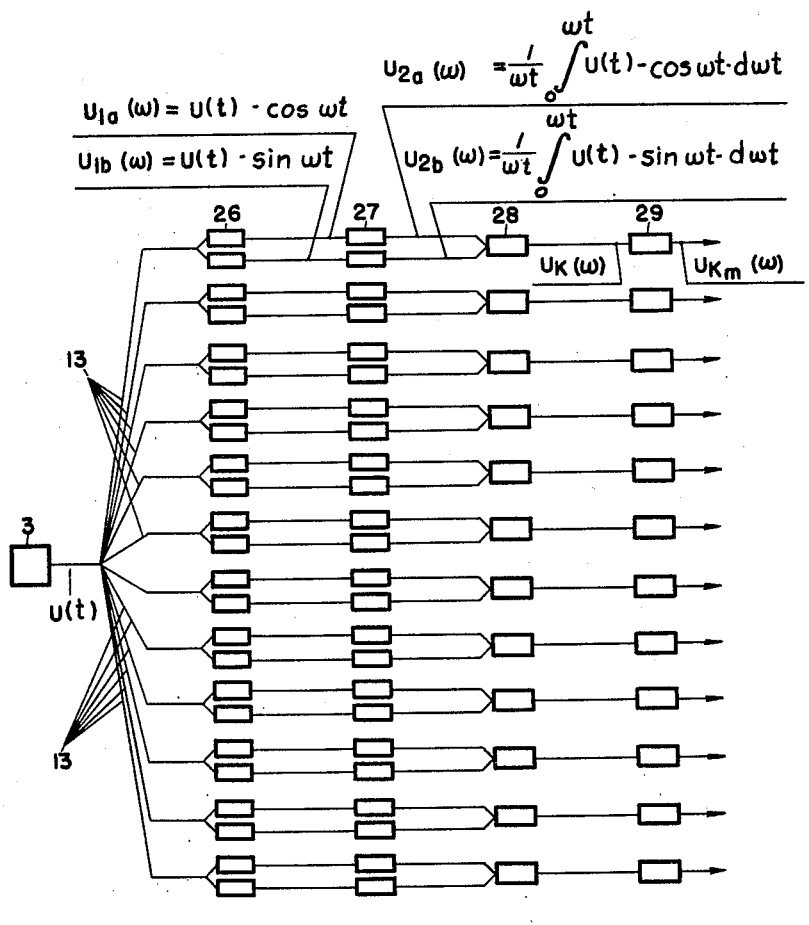

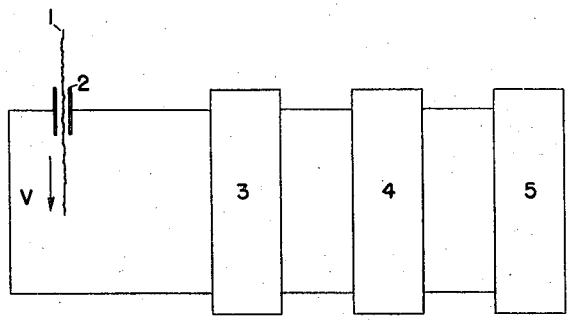
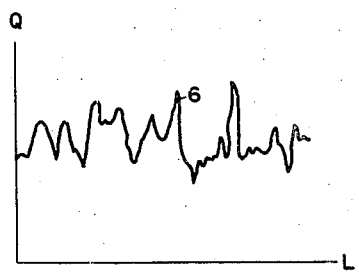
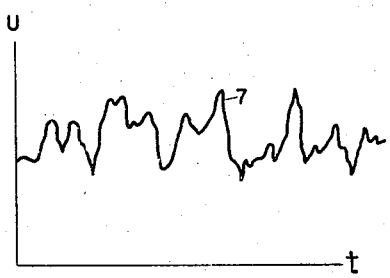
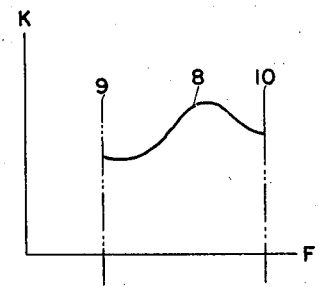
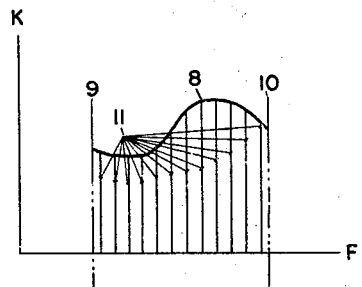
FIG. 1
FIG. 2
FIG. 3
FIG. 4
FIG. 5

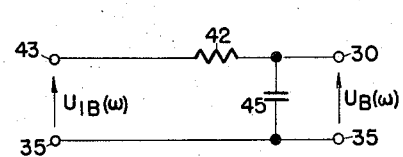
FIG. 11
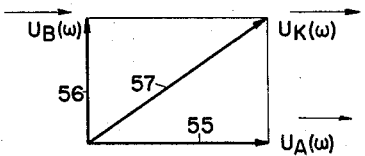
FIG. 13
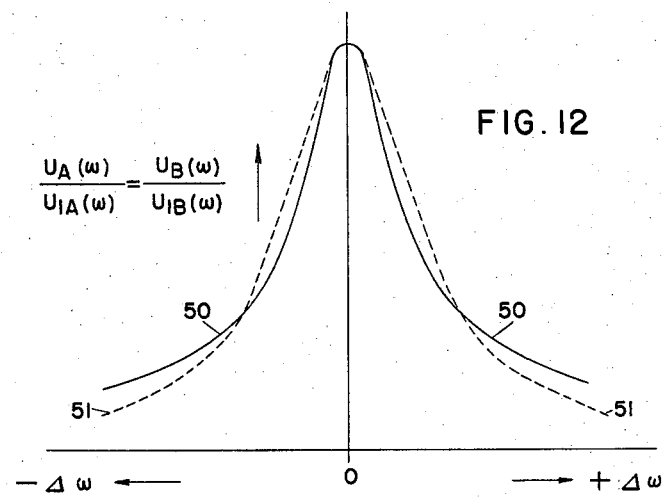
FIG. 12
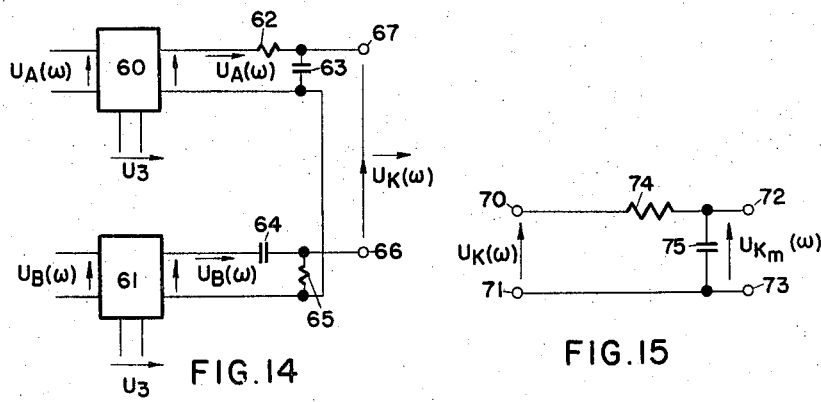
FIG. 14
FIG. 15

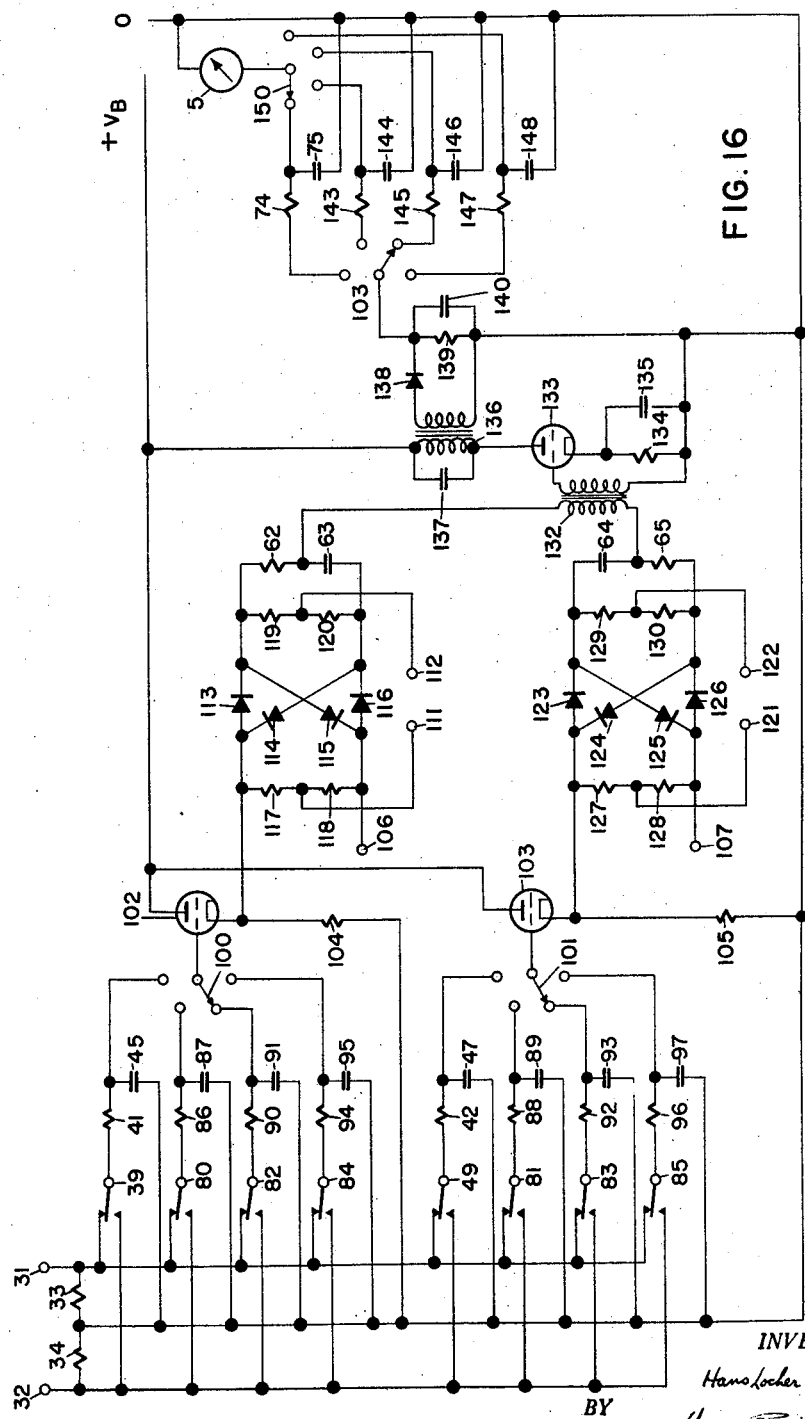

United States Patent Office 2,950,435
Patented Aug. 23, 1960

2,950,435

METHOD AND MEANS FOR DETERMINING PERIODIC VARIATIONS IN VARIABLES ESPECIALLY IN THE CROSS-SECTION OF TEXTILES

Hans Locher and Ernst Felix, Uster, Switzerland, assignors to Zellweger A.G., Uster, Switzerland Filed Sept. 1, 1954, Ser. No. 456,288

13 Claims. (Cl. 324—61)

This invention relates to methods of and means for detecting faults in textiles or other web materials which occur periodically in the course of a series of manufacturing operations.

The general object of the invention is to produce a graph showing what occurs, for example, during the course of processing of a continuous stream of materials such as textile materials, tobacco, or the like. The term "textile material" as here employed will be taken to designate both materials comprising disparate groups of fibers or the like, as well as continuous surface materials. By correlating the speed of travel of the material to be tested with the speed of travel of the graph reflecting the operations producing the material, then a repeating record will be made on the graph corresponding to the cycle of repeating operations employed in the manufacture of the material. Thus, a manifestation at one point of the graph will reflect an operation which takes place at the corresponding point in the cycle of manufacturing operations. By correlating the indication on the graph with the operation reflected thereby it is possible speedily and accurately to detect a fault in the cycle of manufacture as it occurs, ascertain where (on what machine or in which step of manufacture) it occurred, and promptly take steps to remedy the fault.

The system employed by applicants is called a "spectrograph." This is a short name to denote the employment of a wide range of frequencies or wave lengths which produce a recorded pattern or graph reflecting the variations in a material during the course of its manufacture, the cross-sectional variations being measured or "spectrographed" at all points and in all stages of production.

The textile industry in manufacturing various products such as bands, roving, thread or yarn is anxious to obtain as far as possible a uniformity of thickness of the intermediate or finished product. There are already available methods and instruments to test the quality of the product, in particular to electrically record the degree of uniformity of thickness or cross sectional areas of the product with respect to its length. For instance, a method as referred to above is described in Swiss Patent No. 249,096. Applying this method, a functional relationship of the uniformity of the product versus length in terms of electrical values may be obtained and finally recorded on a sheet of paper in form of a diagram. This is done by means of transferring the electrical values to a mechanical recorder.

The recorder forms a diagram which then requires a skilled technician for interpretation. The technician must take considerable time in analysing each of the deviations indicated on the diagram and interpreting them with respect to the process. The skill involved in diagram interpretation, and the time involved is such that the use of such equipment is often dispensed with, with the resultant loss in quality and efficiency.

This invention concerns a method which makes it possible to detect periodic changes of a variable and in particular the magnitude of the amplitude of many component frequencies of this variable. This method is much superior to those presently known especially in the way of final evaluation of the reading as related to the tested product. In particular the above mentioned variable is translated into equivalent electrical terms, and furthermore, these electric terms are transformed electrically into a frequency spectrum.

Some preferred embodiments of this invention, and their mode of functioning will be made most manifest and particulraly pointed out in clear, concise and exact terms in conjunction with the accompanying drawings, which will be hereinafter more fully described.

At the end, on the basis of the Figures 7 to 16 it will be shown by what means the electrical picture of the required frequency spectrum can be made visible.

Figure 1, number 1, indicates the tested product, i.e. a yarn or thread or band 1 which by common mechanical means is being passed with constant velocity through a measuring capacitor 2.

The cross-section (thickness) Q of the tested product 1 is shown in Figure 2 as the function of its length L. Number 3 in Figure 1 represents an apparatus which in a common way measures the product's cross-section $Q=f(L)$ in electrical terms $I=f(t)$ shown as the curve 7 in Figure 3. It makes no difference whether for the ordinate I the magnitude of the electrical current or the voltage is used since by means of an electrical resistance the given current may be easily translated in terms of voltage and vice versa.

The relationship between time $t$, the length L of the product and the velocity $v$ at which the tested product is passing the measuring capacitor, is described by the following equation;

$$t = \frac{L}{v} \qquad (1)$$

By means of an electrical-mechanical device 4, Figure 1, which is to be described later, the electrical imprint of the tested product as by curve 7, Figure 3, will be broken down into a frequency spectrum 8, $K=f(F)$, Figure 4. This frequency spectrum 8 in due course will pass the device 5, Figure 1, where it is made visible by methods also to be described later.

Figure 4, curve 8, which represents a frequency spectrum indicates the average amplitude K of every component frequency F of the curve 7, Figure 3. This average amplitude K is plotted versus its corresponding frequency as shown in the diagram. Cross-sections 9 and 10 are the arbitrarily chosen frequency limits of the frequency spectrum 8, $K=f(F)$ of a given function 7 as per Figure 3. All the frequencies contained between these two limits 9 and 10 are preferably reduced to a finite number of single frequencies 11 as shown in Figure 5. If the corresponding amplitudes K are plotted versus these selected frequencies F they will result in a series of points and a line drawn through these points will produce a continuous curve, i.e. frequency spectrum 8. It is apparent that by doing it not only the selected frequencies 11 but also all the other frequencies laying in between will be incorporated in a single functional relationship.

The determination of the amplitude of the selected single frequencies will be done, preferably, on the basis of Fourier analysis.

$$J = f(\omega t) = a_0 + a_1 \cdot \cos \omega t + a_2 \cdot \cos 2\omega t + \ldots \\ + b_1 \cdot \sin \omega t + b_2 \cdot \sin 2\omega t + \ldots \qquad (2)$$

or $$J = f(\omega t) = a_0 + c_1 \cdot \cos (\omega t + \varphi_1) + c_2 \cdot \cos (2\omega t - \varphi_2) + \ldots \qquad (3)$$

where $$c_1 = \sqrt{a_1^2 + b_1^2} \quad c_2 = \sqrt{a_2^2 + b_2^2} \ldots \quad (4)$$

The symbols contained in these expressions explain as follows:

$J = f(\omega t) =$ any periodic function, i.e. electrical current $J$ versus time $\omega =$ angular velocity of the main frequency (oscillation) of the above function $t =$ time $a_0 =$ D.C. member of the function $a_1, a_2 \ldots, b_1, b_2 \ldots, c_1, c_2 \ldots =$ amplitudes of the component oscillation functions (frequencies)

$\varphi_1, \varphi_2 =$ phase shift of the above mentioned component oscillation functions with reference to the origin (time $t=0$)

$a_1 \cdot \cos \omega t; a_2 \cdot \cos 2\omega t \ldots =$ cosine—oscillation of the above mentioned component functions $b_1 \cdot \sin \omega t; b_2 \cdot \sin 2\omega t \ldots =$ sine—oscillation of the above mentioned component functions $c_1 \cdot \sin (\omega t + \varphi_1); c_2 \cdot \sin (2\omega t + \varphi_2) =$ sine—oscillation combined with the phase shift of the above mentioned component functions The amplitudes, i.e. so called Fourier coefficients $a_0, a_1, a_2 \ldots b_1, b_2 \ldots$ of any of the sine or cosine components oscillation $a_1, a_2 \ldots b_1, b_2 \ldots$, as well as the D.C. member $a_0$ can be determined on the basis of the given function $I = f(\omega t)$ resolving the following integral equations;

$$a_0 = \frac{1}{2\pi} \int_0^{2\pi} f(\omega t) \, d\omega t \quad (5)$$

$$a_1 = \frac{1}{\pi} \int_0^{2\pi} f(\omega t) \cos \omega t \, d\omega t \quad (6)$$

$$b_1 = \frac{1}{\pi} \int_0^{2\pi} f(\omega t) \sin \omega t \, d\omega t \quad (7)$$

In building up the frequency spectrum 8 the D.C. member $a_0$ is of no use since it corresponds in our case to a frequency equal zero $f=0$. In cases where a non periodic function $I=f(t)$ is present the mean value of the Fourier coefficient $a$ or $b$ on the basis of an arbitrarily chosen frequency $\omega$ (between the angular velocity $\omega$ and the frequency $f$ we have the following relationship $f=2\pi\omega$) can be established as follows: the integration which has been done within the limits of a single period, $0-2\pi$ interval must go over this limit covering a series of these intervals and the final product of the integration is to be divided by the number of the selected intervals (periods). For a selected number of the periods $m$ the corresponding equation assumes the following form:

$$a = \frac{1}{m \cdot \pi} \int_0^{m \cdot 2\pi} f(t) \cos \omega t \, d\omega t \quad (8)$$

$$b = \frac{1}{m \cdot \pi} \int_0^{m \cdot 2\pi} f(t) \sin \omega t \, d\omega t \quad (9)$$

If the number of periods $m$ is being increased up to $\infty$ (infinity) then the Fourier coefficient can be obtained for any time interval $t$ by the number of even periods $m.2\pi$ and an odd number of rest periods $z.2\pi$.

Therefore for a very great number $m$ periods the following applies:

$$a = \frac{1}{(m+z) \cdot \pi} \int_0^{2\pi(m+z)} f(t) \cos \omega t \, d\omega t \quad (10)$$

$m \to \infty$ $$b = \frac{1}{(m+z) \cdot \pi} \int_0^{2\pi(m+z)} f(t) \sin \omega t \, d\omega t \quad (11)$$

$m \to \infty$

For practical application sufficient accuracy will be obtained for a finite but an odd number of periods $m$. It can be proven that in case of a sine function the error resulting in taking only 5 periods is no greater than 1½% as compared to an integral where all the periods were taken into consideration. However, in case of non periodic functions it is essential to proceed with the integration over the entire function.

It is equally possible to calculate on the basis of time $t$ instead of the number of periods $(m+z)$. It applies $$m + z = \frac{\omega \cdot t}{2\pi} \quad (12)$$

Then the Equations 10 and 11 assume the following form:

$$a = \frac{2}{\omega \cdot t} \int_0^{\omega t} f(t) \cos \omega t \, d\omega t \quad (13)$$

$$b = \frac{2}{\omega t} \int_0^{\omega t} f(t) \sin \omega t \, d\omega t \quad (14)$$

In order to obtain the frequency spectrum as shown in Figure 4, theoretically speaking the Fourier coefficients are to be established for an infinite number of frequencies. However, this is not practical and only some specific frequencies out of the whole frequency band will have to be used. These frequencies are to be chosen in a way that each one of them will be the most representative one of its particular frequency interval.

Figure 5 shows a typical example where 12 different frequencies (11) are indicated. It is to be noted that these frequencies if selected properly will reflect most accurately the shape of the curve 8, Figure 5.

This approach of the finite number of frequencies selected calls for extension of the Fourier theory in terms of Fourier coefficients A or B or their resultant $$K = \sqrt{A^2 + B^2} \quad (15)$$

which would bridge the gap between the two neighboring selected frequencies. This may be done by establishing a rule as follows: the resultant K of an analyzed frequency that falls in between the frequency limits set by the two previously selected neighboring frequencies may be expressed in terms of percentage fractions $p$ of the Fourier coefficients adherent to these two frequency limits. These percentage fractions $p$ are related to each other in a reverse proportion as the distances (in terms of frequency) of the analyzed frequency from these two frequency limits.

The above statements will be described more closely as follows:

Out of the multitude of the selected frequencies 11, Figure 5, let us take into consideration any two neighboring frequencies, i.e. a frequency $s_n \cdot \omega$ and a frequency $s_{(n+1)} \cdot \omega$

(14) Let us investigate a coefficient A with a frequency $r \cdot \omega$ which falls between the frequency $s_n \cdot \omega$ and $s_{(n+1)} \cdot \omega$;

(15) The component of the Fourier coefficient A of the frequency $r \cdot \omega$ as a fraction of the Fourier coefficient of the frequency $s_n \cdot \omega$;

(16) The component of the Fourier coefficient A of the frequency $r \cdot \omega$ as a fraction of the Fourier coefficient of the frequency $s_{(n+1)} \cdot \omega$;

(17) The frequency distance $(r - s_n) \cdot \omega$;

(18) The frequency distance $(s_{(n+1)} - r) \cdot \omega$;

(19) The functional relationship of the percentage fraction $p_n$ of the Fourier coefficient of the frequency $s_n \cdot \omega$ pertaining to the Fourier coefficient of the analyzed frequency $s_n \cdot \omega$;

(20) The functional relationship of the percentage fraction $p_{(n+1)}$ of the Fourier coefficient of the frequency $s_{(n+1)} \cdot \omega$ pertaining to the Fourier coefficient of the analyzed frequency $s_{(n+1)} \cdot \omega$.

At the end the resulting Fourier coefficient K composed of the component Fourier coefficients A and B is to be established which is equivalent to the same operation performed on the basis of the fractions $p_A$ and $p_B$ with the resultant $p$. This can be accomplished by geometrical addition of the Fourier coefficients A and B respectively $p_A$ and $p_B$.

The following example shows how the above described mathematical operations can be accomplished by means of an electro mechanical apparatus. Referring to Figure 3 there is given a function of current $I=f(t)$ as the equivalent of the tested product cross section.

Required is the frequency spectrum $K=f(F)$ (see Figure 4). Applying the law of Ohm the current function $I=f(t)$ may be replaced by the voltage, function $U=f(t)$. Subsequently on the basis of this voltage function the frequency spectrum will be derived.

The device 3, Figure 1, translates the cross section of the tested product into an electrical equivalent function $I=f(t)$, (see curve 7, Figure 3). The corresponding voltage (function $U=f(t)$) is being fed into 12 different channels of the apparatus (see Figure 6) where each of the channels responds to one particular frequency. It is apparent that all of these 12 channels are the electromechanical equivalents of the 12 selected frequencies previously described. Within each single channel the following mathematical operations will be performed.

The first operation will be executed in the double multiplier 26 where the function $U=f(t)$ is multiplied by $\cos \omega t$ and also independently by $\sin \omega t$. As a result in electrical terms the following functions will be obtained:

$$U_{1a}=f(t)\cdot\cos \omega t \quad (16)$$
$$U_{1b}=f(t)\cdot\sin \omega t \quad (17)$$

In the following double integrator 27 the above written functions $U_{1a}$ and $U_{1b}$ are being integrated and divided on the basis of $\omega t$ in accordance with the following equations:

$$U_{2a}=\frac{1}{\omega t}\int_0^{\omega t} f(t)\cdot\cos \omega t\cdot d\omega t \quad (18)$$

$$U_{2b}=\frac{1}{\omega t}\int_0^{\omega t} f(t)\cdot\sin \omega t\cdot d\omega t \quad (19)$$

In comparing the Equations 18 and 19 with the Equations 13 and 14 it can be seen that the voltages $U_{2a}$ and $U_{2b}$ are to be regarded as the equivalent values of the Fourier coefficients $a$ and $b$. In addition to the above described operation of integration and division care is being taken of the small deviations in the coefficients $U_{2a}$ and $U_{2b}$ resulting in the assumption of a finite number of frequencies whereas the ideal solution will call for an infinite number of frequencies. How this additional correction during this second operation is done is to be described later. Within the component 28 of the device (see Figure 6) the third operation of the geometrical addition of the voltages $$U_k=\sqrt{U_{2a}^2+U_{2b}^2} \quad (20)$$

(Compare with Equation 15.)

The following is a detailed description of how the hitherto discussed mathematical computations can be accomplished by means of this invention. This will be done in analyzing one of the channels 13 (Figure 6).

Figure 7:
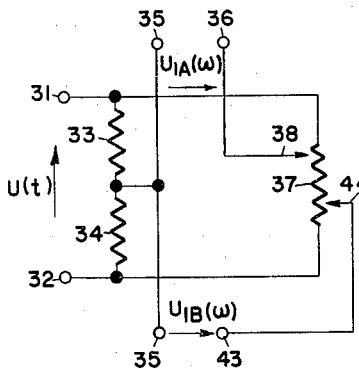

Figure 7 represents the schematic diagram of this section of the apparatus where the first operation can be performed:

At the terminals 31 and 32 the voltage $U=f(t)$ is being applied.

At the terminals 35 and 36 the voltage $$U_{1A}=\tfrac{1}{2}f(t)\cdot\cos \omega t \quad (21)$$

will be obtained. This will be the case if the receiving tap 38 performs a cosine motion with the frequency $\omega$ along the whole resistance 37 and the resistances 33 and 34 are equal in their ratings.

Similarly at the terminals 35 and 43 the voltage $$U_{1B}=\tfrac{1}{2}f(t)\cdot\sin \omega t \quad (22)$$

will be obtained. This will be the case if the receiving tap 44 performs a sine motion with the frequency $\omega$ along the whole resistance 37.

The same result in voltages $U_{1A}$ and $U_{1B}$ may be obtained if both of the receiving taps 38 and 44 perform a cosine motion but with a phase lag of 90° with respect to each other, i.e. tap 44 with respect to tap 38.

In comparing the Equations 16 and 21 with Equations 17 and 22 it can be seen that $U_{1a}$ and $U_{1A}$ as well as $U_{1b}$ and $U_{1B}$ differ from each other only by factor 2.

A proper design of a device which would accomplish in a mechanical way the desired motion of the receiving taps 38 and 44 along the resistance 37 is not easy. For this reason instead of adopting the method as per Figure 7 another method (see Figure 8) may be used, where two switches 39 and 44 do approximately deliver the required voltages $U_{1A}$ and $U_{1B}$.

Figure 8:
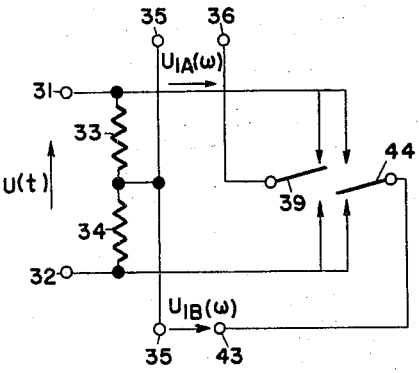
Figure 9:
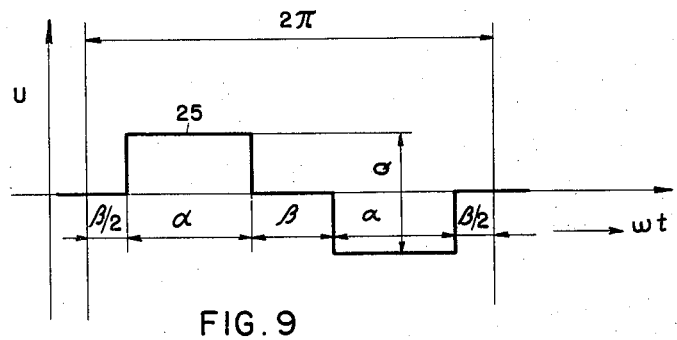

This may be explained as follows:

If the voltage U at the terminals 31 and 32 for instance has a constant value Q then at the terminals 35 and 36, Figure 8, a voltage will be obtained which timewise corresponds to the function 25, Figure 9. A function like that broken down into its main oscillations and its harmonics assumes the following form:

$$f(\omega t)=\frac{2Q}{\pi}\left[\frac{\cos\frac{1}{2}(\pi-\alpha)}{1}\sin \omega t+\frac{\cos\frac{3}{2}(\pi-\alpha)}{3}\sin 3\omega t +\frac{\cos\frac{5}{2}(\pi-\alpha)}{5}\sin \omega t \ldots\right] \quad (23)$$

where $\alpha$=the length of the impulse in radians.

Therefore in applying a method as in Figure 8 an error $F_H$ will be introduced so far that the function $U=f(t)$ instead of being multiplied only by $\sin \omega t$ will be also multiplied in addition by $\sin n\cdot\omega t$ where $n$ is the order number of the harmonics of the $\omega$. Therefore the frequencies $n\cdot\omega$ of the function 7 $U=f(t)$ will be partly analyzed and their Fourier coefficients partly incorporated into the Fourier coefficients of the $\omega$.

However, it is possible to reduce efficiently this error $F_H$ by an appropriate selection of the length $\alpha$ of the impulse. For instance the error $F_H$ of the member of the third harmonic may be made equal to zero, if the factor $$[\cos \tfrac{3}{2}(\pi-\alpha)]$$

of the Equation 23 is set equal to zero. This will be always the case if $\alpha$ amounts to $\tfrac{2}{3}\pi$ which corresponds to an 120° angle.

If the $\alpha$ equals $\tfrac{2}{3}\pi$ then the member of the fifth harmonic will deliver an error of 17%. However the error of the fifth harmonic as well as the smaller errors of the higher harmonics may be almost completely eliminated by means of a low-pass filter introduced in front of the terminals 31 and 32.

The same relations, of course, will apply to the switch 44 if its motion is similar to that of the switch 39 except for the necessary phase lag of 90°.

Figure 10:
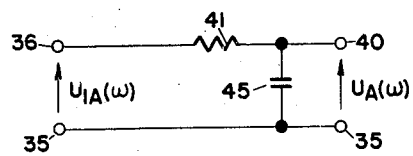

The second operation as previously described will be preferably accomplished in a similar manner by means of two R-C members as indicated in Figure 10 and Figure 11. These two R-C members or system components have the same time constant T. At the terminals 35 and 36 the voltage $U_{1A}$ (Equation 21, Figure 10) and at the terminals 35 and 43 the voltage $U_{1B}$ (Equation 22, Figure 11) will be applied. As it is known, in case of R-C member, as in Figure 10, the voltage derived at the terminals 35 and 36 corresponds to an arithmetical mean value of the voltage $U_{1A}$, if the initial surge at the start up of the system is neglected and the time constant T made equal to the one which inheres in determination of the mean value of the same function. The mean value of a voltage function $U_{1A}=f(t)$ within the limits of time, $0-t$ is given by the following expression:

$$U_A = \frac{\int_0^t U_{1A} dt}{t} \quad (24)$$

Introducing $$dt = \frac{d\omega t}{\omega} \quad (25)$$

into Equation 24

$$U_A = \frac{\int_0^{\omega t} U_{1A} d\omega t}{\omega . t} \quad (26)$$

will be obtained.

Introducing the Equation 21 into Equation 26 it follows:

$$U_A = \frac{1}{2\omega t} \int_0^{\omega t} f(t) . \cos \omega t . d\omega t \quad (27)$$

In comparing the Equations 26 and 13 it can be seen that their only difference is given by a constant factor 4. Thus $U_A$ is proportional to the required Fourier coefficient $a$. The above derivations of the performance of the R-C member, Figure 10, applies equally to the R-C member, Figure 11, where $U_{1B}$ and $U_B$ takes place of $U_{1A}$ and $U_A$. We obtain for $U_B$ $$U_B = \frac{1}{2\omega t} \int_0^{\omega t} f(t) . \sin \omega t . d\omega t \quad (28)$$

Here in the same way as before, the only difference between the Equations 28 and 14 is given by a constant factor 4. Therefore $U_B$ is directly proportional to the required Fourier coefficient $b$.

So far in describing the first and the second operation it has been shown that the Fourier coefficients $a$ and $b$ of the applied $f$ voltage function $U=f(t)$ at the terminals 31 and 32 could be obtained with the only limitations such as the inrush conditions or surge at start and the time constant T. It has also been shown that the frequencies $r.\omega$ differ from those selected $$s_n . \omega$$

see item 14 and call for the expansion of the Fourier theory. The limitations imposed by use of the R-C member, however, prove to be helpful since they make the introduction of the above mentioned expansion of the Fourier theory possible. This will be shown in the following derivations. Given is a function 7, Figure 3, $I=f(t)$ for instance $I=\sin r.\omega t$. Then assume a given single frequency $s_n \omega$.

If the frequency $r.\omega$ of the given function equals the frequency $s_n.\omega$ of the analyzed function then as the result of the first and the second operation described above, the measured voltages $U_A$ and $U_B$ will conform exactly with the Fourier coefficients $a$ and $b$. However, it is also important to obtain the exact values of $U_A$ and $U_B$ in cases when $s_n.\omega$ and $r.\omega$ are different and not equal. To begin with, let us perform the first operation on basis of a given function $I=\sin r\omega t$. This is to be done in full agreement with the Equations 21 and 22. Since $f(t)=\sin r\omega t$ as the result of introduction of the Equation 21 into Equation 22 the following expressions will be obtained:

$$U_{1A} = \tfrac{1}{2} . \sin r\omega t . \cos s_n \omega t \quad (29)$$
$$U_{1B} = \tfrac{1}{2} . \sin r\omega t . \sin s_n \omega t \quad (30)$$

The goniometric rearrangement will result in $$U_{1A} = \tfrac{1}{4} [\sin (r-s_n).\omega t - \sin (r+s_n).\omega t] \quad (31)$$
$$U_{1B} = \tfrac{1}{4} [\cos (r-s_n).\omega t - \cos (r+s_n).\omega t] \quad (32)$$

These voltages $U_{1A}$ and $U_{1B}$ are actually the regular alternating voltages with frequencies $(r-s).\omega$ and $(r+s).\omega$.

These frequencies are also of influence on the values of $U_A$ and $U_B$ (Figure 10 and Figure 11). However, more practical is to take into consideration the ratio of $U_A$ and $U_{1A}$ as well as the ratio of $U_B$ and $U_{1B}$. Since the voltages $U_{1A}$ and $U_{1B}$ are of the same frequencies and both R-C members operate on the basis of the same time constant T it follows:

$$\frac{U_A}{U_{1A}} = \frac{U_B}{U_{1B}} \quad (33)$$

Furthermore in case of an R-C member as shown in Figure 10 and Figure 11 the following relationship between the expressions $$\frac{U_A}{U_{1A}}, \quad \frac{U_B}{U_{1B}}$$

and $\Delta\omega$ will hold;

$$\frac{U_A}{U_{1A}} = \frac{U_B}{U_{1B}} = \frac{1}{\sqrt{1+(\Delta\omega . R . C)^2}} \quad (34)$$

where $\Delta\omega$ = the overall circuit frequency of the voltages $U_{1A}$ and $U_{1B}$. If we replace the frequency $\Delta\omega$ by the frequency $(r-s_n).\omega$ as a result we will obtain $$\frac{U_A}{U_{1A}} = \frac{U_B}{U_{1B}} = \frac{1}{\sqrt{1+[(r-s_n).R.C]^2}} \quad (35)$$

However, if $r.\omega$ represents a frequency 14 being in the closest proximity of the selected singular frequency 11 $s_n.\omega$, then $(r-s_n).\omega$ will be very small and the ratio $$\frac{U_A}{U_{1A}} = \frac{U_B}{U_{1B}}$$

will be almost equal to unity.

Should the frequency $(r-s_n).\omega$ replace the frequency $\Delta\omega$ in the Equation 34 then the following relationship holds:

$$\frac{U_A}{U_{1A}} = \frac{U_B}{U_{1B}} = \frac{1}{\sqrt{1+[(r+s_n).\omega R.C]^2}} \quad (36)$$

The value of the frequency $(r+s_n).\omega$ is in any event very large and therefore the ratio $$\frac{U_A}{U_{1A}} = \frac{U_B}{U_{1B}}$$

must be very small (practically it may be assumed as to equal zero). Therefore in the Equation 31 the $$\frac{U_A}{U_{1A}}$$

term which appears in conjunction with the frequency $(r+s_n).\omega$ may be entirely neglected. The same applies to the term $$\frac{U_B}{U_{1B}}$$

So far the two ratios $$\frac{U_A}{U_{1A}}$$

and $$\frac{U_B}{U_{1B}}$$

have been obtained as the functions of $\Delta\omega=(r-s_n).\omega$ and they are shown in Figure 12 as the curve 50. Also, it has been shown how the Fourier coefficients of the frequency $r.\omega$ could be described in terms of the percentage fractions $p_n$ of the Fourier coefficients pertaining to the selected frequencies $s_n.\omega$, with respect to their relative position $(r-s_n).\omega$. However, according to the previously given definition, the curve 50 as seen in Fig. 12 should conform with the curve 19. If the degree of conformity of these curves is not sufficient then in place of the single R-C member an electrical filter may be introduced, i.e. double R-C member. Under these circumstances it is possible to obtain a curve like the one shown in Figure 12 (curve 51).

The curves 50 (or 51) thus directly determine the time constant T of the R-C member. Under these circumstances the previously discussed situation (in which the time constant T must be much longer than the length of time used up by the function 7, Figure 3, $I=f(t)$) may not be satisfied. Should we measure, however, during the time period of the function 7, $I=f(t)$ at equal time intervals $\Delta T$, which are small as compared to the time constant T, the voltages $U_A$ and $U_B$, then the voltages $U_A$ and $U_B$ are directly proportioned to the Fourier coefficients $A_1$ and $B_1$ over a time interval $\Delta T$ equal to the time constant T. Further on, do we take the arithmetic mean values of the measured absolute voltage $U_A$ and $U_B$ then as the result the mean voltages $U_{Am}$ and $U_{Bm}$ will be obtained. These mean voltages $U_{Am}$ and $U_{Bm}$ then correspond to the Fourier coefficients A and B timewise for any length of the function 7, $I=f(t)$ that may possibly occur. However, for practical reasons it is advisable to establish a voltage $U_{K1}$ which corresponds to a Fourier coefficient $K_1$ within the time limit $\Delta T$. This problem is to be described in detail at the time when third operation of the whole system will be analyzed.

The third operation should combine the voltages $U_A$ and $U_B$ into a resultant in agreement with the equation below:

$$U_K=\sqrt{U_A^2+U_B^2} \qquad (37)$$

This may be accomplished if each of the voltages $U_A$ and $U_B$ is going to be modulated by an alternating voltage $U_3$ of the same frequency. Therefore the alternating amplitudes $\vec{U}_A$ and $\vec{U}_B$ will be directly proportioned to the voltages $U_A$ and $U_B$. If these two voltages are applied simultaneously with a phase lag of 90° then the addition of the instantaneous values of each of them will deliver a resulting alternate voltage $\vec{U}_K$ with an amplitude $U_K$. Figure 13 shows the corresponding vector diagram where 55 the vector of the alternating voltage $\vec{U}_A$ 56 the vector of the alternating voltage $\vec{U}_B$ 57 the resulting vector as a product of the geometrical addition of vectors $\vec{U}_A$ and $\vec{U}_B$ Figure 14 shows a schematic diagram of a system which may be used for geometrical addition of two voltages. For instance in two ring modulators 60 and 61 which are operated by a modulating voltage $U_3$ the two voltages $U_A$ and $U_B$ are being transformed into alternating voltages $\vec{U}_A$ and $\vec{U}_B$. These two voltages, however, timewise are in the same phase. If a time constant $T_3$, which is produced by means of a resistance 62 and a capacitor 63 as well as a resistance 65 and a capacitor 64, is equal to the reciprocal value of the circuit frequency $\omega_3$ of the modulating voltage $U_3$, then at the terminals of the capacitor 63 a voltage $$U_A \frac{1}{\sqrt{2}}$$

can be derived. This voltage will also appear with a phase lag $-45°$. In similar ways at the terminals of the resistance 65 a voltage $$U_B \frac{2}{\sqrt{2}}$$

with a phase lag of $+45°$ can be expected. The total phase lag will amount to 90°. Therefore at the terminals 66 and 67 an alternating voltage $U_K$ may be picked up and this voltage will be equivalent to the one (vector 57) shown in Figure 13. If we rectify this alternating voltage then as the product a voltage $$\frac{1}{\sqrt{2}} U_K$$

will be obtained. Referring to column 9, line 7, if the time period of the function 7, Figure 3, $I=f(t)$ is comparatively long then we have to divide this period in a number of time intervals $\Delta T$. In such a case we also have to calculate the mean values of the Fourier coefficients $A_1$ and $B_1$ or $U_A$ and $U_B$ for every time interval $\Delta T$, which is equivalent to finding the mean values of the Fourier coefficients $K_1$ or voltages $U_{K1}$ also for each of these time intervals $\Delta T$. The evaluation of the mean values may be accomplished by a device 29, Figure 6. This device may be composed of a R-C member with an adherent time constant $T_1$ which is large enough as compared to the length of the time period of the function 7, $I=f(t)$. Figure 15 shows a device containing a R-C member equipped with a resistance 74 and a capacitor 75. At the terminals 70 and 71 the voltage $U_{K1}$ will be applied and at the terminals 72 and 74 the mean value of the voltage $U_K$ will be obtained. If the voltages $U_K$ of any of the channels 13 are introduced in the sequence of their respective frequencies $\omega$ through an electro mechanical selector switch 150, Figure 16, into a recording device 5, i.e. a device equipped with continuously fed graph paper, then the diagram drawn on this graph paper will be the required frequency spectrum 8 as shown in Figure 5. However, it is not necessary to provide every one of the channels 13 with all the electronic equipment. For instance a single equipment component 28 (a place where the geometrical addition is being performed) may serve all of the channels 13 in any desired sequence, although for a short fraction of time only. This will, however, require an addition of the electro magnetic selector switches 100, 101, 99, Figure 16. These switches will have to be incorporated into equipment component 28, Figure 6.

Figure 16 shows a detail layout of the present invention. It contains 4 channels 14 with 4 selected single frequencies and also a single device 28. At the terminals 31 and 32 the voltage function to be analyzed is applied, and subsequently introduced to the switches 39, 80, 82, 84, 49, 81, 83 and 85. Here the following switches are operated pairwise with the same frequency and 90° phase lag: 39 and 49, 80 and 81, 82 and 83, 84 and 85. From this point on the voltages reversed in polarity are conducted through the resistances 41, 86, 90, 94, 42, 88, 92, 96 up to the capacitors 45, 87, 91, 95, 47, 89, 93 and 97. The way these components of the equipment operate has been previously described. The voltages at the capacitors terminals are henceforth tapped off by selector switches 100 and 101 and fed into a cathode amplifier of a common kind and of a negligible small entrance impedance and then subsequently introduced to a series of ring modulators. The cathode amplifier contains tube 102 or tube 103 and also resistance 104 or 105. The ring modulator contains diode 113, 114, 115 and 116 or 123, 124, 125 and 126, also resistances 117, 118, 119 and 120 or 127, 128, 129 and 130. The modulating voltage is to be applied at the terminals 111 and 112 or 121 and 122. At the terminals 106 and 107 so-called comparing voltage that is required for the cathode amplifier is applied. From this point on the voltage is conducted up to the R-C devices where the phase shift of 90° is accomplished. These two R-C devices consist of resistance 62 and capacitor 63 or resistance 64 and capacitor 65. The way these two R-C devices operate has been previously described. The alternating voltage leaving the R-C devices passes the transformer 132 introduced at the entrance of an amplifier stage of a common type. This amplifier consists of the tube 133, resistance 134, capacitor 135 and a resonance-transformer 136 equipped with a capacitor 137. The latter is used to eliminate the disturbing harmonics. The leaving side of the transformer 136 is provided with a rectifier. This rectifier consists of a diode 138, operating resistance 139 and a capacitor 140. From this point on the rectified voltage reaches the selector switch 99, whose operating condition was previously explained. Passing this selector switch the voltage is introduced to the R-C members. These R-C members consist of resistances 74, 143, 145 and 147 and of capacitors 75, 144, 146 and 148. The way these R-C members operate has been also previously explained. Finally the voltages picked up from the terminals of the above mentioned capacitors are transferred through the selector switch 150 and fed into the recording device 5. If this recording device employs linear scale (exponent 1) then the recorded frequency spectrum will be also of linear type. However, if a square scale (exponent 2) is employed then the recorded frequency spectrum will be of the square type. In following another method of accomplishing the third operation: $U_K$ results from the Equation 15 is $$U_K = \sqrt{U_A^2 + U_B^2} \qquad (15)$$

Raising both sides of this equation to the second power the following expression will be obtained:

$$U_K^2 = U_A^2 + U_B^2 \qquad (38)$$

In other words an arithmetical addition of squared voltages $U_A$ and $U_B$ produces the square of the voltage $U_K$. Introducing a voltage which is directly proportional to $U_K^2$ to the recording device 5 of a linear scale (exponent 1), a frequency spectrum of the square type (exponent 2) will be obtained. However, if the recording device is provided with a scale of the square root type (exponent ½) as a result the obtained frequency spectrum will be of the linear type (exponent 1).

In the following paragraph reference is made to another approximate solution as variant for producing the frequency spectrum.

Depending on the type of the function 7, $I=f(t)$, to be analyzed (for instance a non-periodic function 7 of very long duration), a more simple electro-mechanical arrangement than the one previously described will in practice be sufficient for determining the approximate frequency spectrum 8. This simplification consists in analyzing in the same manner as previously described either the Fourier coefficients A or the Fourier coefficients B. If now the Fourier coefficients A and B are shown on a diagram in accordance with the previously described manner to obtain the resulting Fourier coefficient K then the recorded picture agrees approximately with the frequency spectrum 8. Consequently an additional simplification of the electro-mechanical arrangement will take place since the equipment component 28 used for forming the resultant Fourier coefficient K becomes useless.

The following paragraph refers to still another approximate solution: Hitherto it has always been mentioned that the frequency spectrum 8 is composed of the measured values of a number of fixed single frequencies 11. If, however, the type of the function 7, $I=f(t)$, permits (for instance a periodic function 7 of very long duration), the so-called fixed single frequencies 11 need no longer remain fixed, but may be formed as variable single frequencies. Thus, for instance, a single variable frequency may vary over the whole frequency range between the frequency limits 9 and 10 (see Figure 5). In this manner the mean values of the Fourier coefficients $A_2$ and $B_2$ or $K_2$, pertaining not only to a given singular frequency $\omega_2$, but also to frequencies close by, will be obtained solely on the basis of the frequency $\omega_2$ and adherent time interval $\Delta t_2$. Here again in order to obtain the required frequency spectrum the Fourier coefficients $A_2$ and $B_2$ or $K_2$ obtained in the above described manner may be led in terms of equivalent voltages to an electrical recording device 5.

Naturally the application of the system described in this patent application is not solely confined to determining periodic changes in the cross-section of the tested textile product. This system can be used in all cases where from a given variable an electrical imprint and subsequently its frequency spectrum shall be derived. Preferably, this kind of system is suitable for analysis of very low frequencies. In particular the most suitable operating range falls in the neighborhood of 0.01 Hertz.

The above disclosure has been given by way of illustration and elucidation, and not be way of limitation, and it is desired to protect all embodiments of the herein disclosed inventive concept within the scope of the appended claims.

We claim:

1. A method for determining the wave length spectrum of the weight variations per unit length of a textile material or the like, said method comprising the steps of: reproducing the weight per unit length of the textile material as an electrical magnitude; continuously and simultaneously multiplying the electrical magnitude once with $\sin(2\pi Ft)$ and once with $\cos(2\pi Ft)$, F signifying any frequency of the desired spectrum and $t$ signifying the time period, then averaging by itself each of the two products thus continuously obtained over a time period from 0 to $t$, and forming the square root of the sum of the squares of the two average values to obtain a magnitude corresponding to the average amplitude of the frequency F of the electrical magnitude over the time period from 0 to $t$.

2. The method according to claim 1 characterized by forming the square root of the sum of the squares of the two average values by forming two alternating voltages equivalent with respect to size of amplitude but displaced by 90° in phase with respect to each other from the two average values, and adding the momentary values of the two alternating voltages to give an alternating voltage having an amplitude equivalent to the square root of the sum of the squares of the two average values.

3. A method for determining the wave length spectrum of the weight variations per unit length of a textile material or the like, said method comprising the steps of: reproducing the weight per unit length of the textile material as an electrical magnitude; continuously and simultaneously once with $\sin(2\pi Ft)$ and once with $\cos(2\pi Ft)$, F signifying any frequency of the desired spectrum and $t$ signifying the time period, then averaging by itself the two products thus continuously obtained, forming the square root of the sum of the squares of the two average values at time intervals of $\Delta t$, and averaging the square root of the squares of the two average values, and indicating an average value corresponding in an approximation dependent on the time interval $\Delta T$, to the sum of the amplitudes of the frequency F of the electrical magnitude averaged over the time period from 0 to $t$ and to the portion, determined by the manner of the approximation when averaging the two products, of the amplitudes averaged over the time period 0 to $t$ of frequencies of the electrical magnitude $U(t)$ which neighbor the frequency F.

4. In apparatus for determining the wave length spectrum of the weight variations per unit length of textile material, said apparatus comprising: means for reproducing the weight per unit length of textile material as an electrical magnitude, said means including at least two channels, each channel being assigned to a freely determinable frequency band, each of said channels including at least at first variable voltage divider for continuously multiplying the electrical magnitude $U(t)$ with $\sin(2\pi Ft)$ and at least one second variable voltage divider for continuously multiplying the electrical magnitude $U(t)$ with $\cos(2\pi Ft)$ in which F signifies any frequency of the desired spectrum and $t$ the time period, at least two electrical filters dependent on the frequency to continuously form two average values over the time period from 0 to $t$ from the two obtained products $U(t).\sin(2\pi Ft)$ and $U(t).\cos(2\pi Ft)$ and means for forming the square root from the sum of the squares of the two average values and an indicating device for indicating the square root of the sum of the two squares, all of said means being electrically coupled.

5. Apparatus according to claim 4 in which the device for forming the frequency spectrum includes at least one switch which connects at least two channels one after the other to the means for forming the square root from the sum of the squares to permit the same means to be used in common for several channels to form the square root of the sum of the squares.

6. Apparatus according to claim 4 in which the device for forming the frequency spectrum includes at least one switch which connects two channels one after the other to the indicating device to permit the indicating device to be used in common for several channels.

7. Apparatus according to claim 5 in which each channel includes at least a first variable voltage divider for continually multiplying the electrical magnitude $U(t)$ with sin $(2\pi Ft)$ and at least one second variable voltage divider for continuously multiplying the electrical magnitude $U(t)$ with cos $(2\pi Ft)$ F signifying any frequency of the desired spectrum and $t$ the time period, at least two electrical filters dependent on the frequency to form two average values from the two obtained products $U(t).\sin (2\pi Ft)$ and $U(t).\cos (2\pi Ft)$, means for forming the square root from the sum of the squares of the two average values, means for forming the average value from the square root of the sum of the squares over the time period from 0 to $t$ and an indicating device for indicating the average value, all of said means being electrically coupled.

8. In apparatus for determining the wave length spectrum of the weight variations per unit length of textile material, and apparatus comprising: means for reproducing the weight per unit length of textile material as an electrical magnitude, said means including at least two channels, each channel being assigned to a freely determinable frequency band, each channel comprising at least one variable voltage divider for continuously multiplying the electrical magnitude $U(t)$ with sin $(2\pi Ft)$ F signifying any frequency of the desired spectrum and $t$ the time period, at least one electrical filter for the continuous approximate forming of the average value from the obtained product $U(t).\sin (2\pi Ft)$ means for forming the absolute magnitude of the average value over the time period from 0 to $t$ and an indicating device for indicating the average value, all of said means being electrically coupled.

9. Apparatus according to claim 8 in which the device for forming the frequency spectrum includes at least one switch connecting at least two channels one after the other continuously to the means for forming the absolute magnitude for several channels in common.

10. Apparatus according to claim 8 in which the device for forming the frequency spectrum includes at least one switch connecting at least two channels one after the other continuously to the indicating device to permit use of the indicating device for several channels in common.

11. A system for determining the wave length spectrum of the weight variations per unit length of textile material, said system comprising: means for reproducing the weight per unit length of textile material as an electrical magnitude; means for passing said textile material through said means for reproducing the weight per unit length as an electrical magnitude; means for producing the frequency spectrum of said electrical magnitude; and means for indicating and recording said frequency spectrum, which represents the wave length spectrum in the case of a corresponding transformation of the frequency scale.

12. In a system for measuring selected frequency components of variations per unit length of a textile material having a continuous complex oscillatory spectrum: means for reproducing said variations as an equivalent voltage; a pair of multiplying circuits connected to said reproducing means, the first of said multiplying circuits including means for multiplying said voltage by a sine function and the second of said multiplying circuits including means for multiplying said voltage by a cosine function, the frequency of said functions being related to said selected frequency component; low pass filters with a relatively short time constant connected to each of said multiplying circuits responsive to the products of said voltage and said sine function and said cosine function respectively; means for additively combining the output energies of said low pass filters; a further low pass filter with a relatively high time constant connected to said means for additively combining the energies; and means for indicating the resultant value in the output of said high time constant low pass filter.

13. In a system for measuring selected frequency components of variations per unit length of a textile material having a continuous complex oscillatory spectrum: means for reproducing said variations as an equivalent voltage; a multiplying circuit connected to said reproducing means, said multiplying circuit including means for multiplying said voltage by a sine function, the frequency of said sine function being related to said frequency component; a low pass filter with a relatively short time constant connected to said multiplying circuit responsive to the product of said voltage and said sine function; rectifying means in the output of said low pass filter; a further low pass filter with a relatively high time constant connected to the output of said rectifying means; and means for indicating the resultant value in the output of the low pass filter with relatively high time constant.

References Cited in the file of this patent

UNITED STATES PATENTS

| | | |
|---|---|---|
| 2,397,961 | Harris | Apr. 9, 1946 |
| 2,476,445 | Lacy | July 19, 1949 |
| 2,522,369 | Guanella | Sept. 12, 1950 |
| 2,530,693 | Green | Nov. 21, 1950 |
| 2,602,836 | Foster et al. | July 8, 1952 |
| 2,629,000 | Olson et al. | Feb. 17, 1953 |
| 2,680,228 | Smith | June 1, 1954 |
| 2,696,891 | Neufeld | Dec. 14, 1954 |
| 2,752,092 | McDonal | June 26, 1956 |
| 2,839,149 | Piety | June 17, 1958 |

OTHER REFERENCES

"Harmonic Synthesizer for Demonstrating and Studying Complex Wave Forms" article in Journal of Scientific Instruments, October 1944; pages 174–177.

Review of Scientific Instruments, vol. 24, No. 4, April 1953; pages 272–275.

"A Fourier Analyzer," article by F. J. McDonal in The Review of Scientific Instruments, April 1953; pp. 272–276.

"Harmonic Analyzer," article in Electronics, December 1953; page 193.

"A Multichannel Noise Spectrum Analyzer for 10–10,000 Cycles," article in the Review of Scientific Instruments, September 1954; pages 899–901.

"Frequency Analyzer Uses," article in Electronics, May 1, 1959, pages 56–57.